US008649389B2

(12) United States Patent
Fox et al.

(10) Patent No.: US 8,649,389 B2
(45) Date of Patent: Feb. 11, 2014

(54) PRIORITISING DATA TRANSMISSION

(75) Inventors: David Fox, Reading (GB); Alessandro Goia, San Benigno Canavese (IT)

(73) Assignee: Vodafone Group Services Limited, Newbury, Berkshire (GB)

( * ) Notice: Subject to any disclaimer, the term of this patent is extended or adjusted under 35 U.S.C. 154(b) by 255 days.

(21) Appl. No.: 12/225,779

(22) PCT Filed: Mar. 30, 2007

(86) PCT No.: PCT/GB2007/001176
§ 371 (c)(1),
(2), (4) Date: Feb. 17, 2009

(87) PCT Pub. No.: WO2007/113517
PCT Pub. Date: Oct. 11, 2007

(65) Prior Publication Data
US 2009/0168793 A1    Jul. 2, 2009

(30) Foreign Application Priority Data

Mar. 30, 2006 (GB) .................................. 0606367.1
Sep. 26, 2006 (GB) .................................. 0618933.6

(51) Int. Cl.
*H04L 12/28* (2006.01)
*H04L 12/56* (2011.01)
*H04L 12/54* (2013.01)

(52) U.S. Cl.
CPC ................................. *H04L 12/5693* (2013.01)
USPC ........ 370/412; 370/235; 370/235.1; 370/310; 370/413; 370/414; 370/415; 370/416; 370/417

(58) Field of Classification Search
None
See application file for complete search history.

(56) References Cited

U.S. PATENT DOCUMENTS

| | | | | | |
|---|---|---|---|---|---|
| 5,521,916 | A | * | 5/1996 | Choudhury et al. | .......... 370/414 |
| 5,553,073 | A | * | 9/1996 | Barraclough et al. | ........ 370/455 |
| 5,872,938 | A | * | 2/1999 | Williams | ....................... 710/112 |
| 6,105,086 | A | * | 8/2000 | Doolittle et al. | ................ 710/52 |
| 6,144,669 | A | * | 11/2000 | Williams et al. | .............. 370/401 |

(Continued)

FOREIGN PATENT DOCUMENTS

WO    WO 03/071740    8/2003

OTHER PUBLICATIONS

3GPP TS 23.236 V7.0.0 (Dec. 2006), Technical Specification, 3rd Generation Partnership Project; Technical Specification Group Services and System Aspects; Intra-domain connection of Radio Access Network (RAN) nodes to multiple Core Network (CN) nodes (Release 7), 37 pp.

*Primary Examiner* — Ayaz Sheikh
*Assistant Examiner* — Peter Chau
(74) *Attorney, Agent, or Firm* — Muirhead and Saturnelli, LLC

(57) ABSTRACT

Transmitting from a mobile terminal to a telecommunication network data stored in a plurality of queues, each queue having a respective transmission priority, includes setting the data in each of the queues to be either primary data or secondary data, or a combination of primary data and secondary data. The data may be transmitted from the queues in an order in dependence upon the priority of the queue and whether the data in that queue are primary data or secondary data. Resources for data transmission may be allocated such that the primary data of each of the queues are transmitted at a minimum predetermined rate and such that the secondary data of each of the queues are transmitted at a maximum predetermined rate, greater than the minimum predetermined rate.

21 Claims, 6 Drawing Sheets

(56) References Cited

U.S. PATENT DOCUMENTS

| | | | |
|---|---|---|---|
| 6,275,488 B1* | 8/2001 | Cudak et al. | 370/347 |
| 6,771,653 B1 | 8/2004 | Le Pennec et al. | |
| 6,810,426 B2* | 10/2004 | Mysore et al. | 709/234 |
| 7,620,054 B2* | 11/2009 | Katayama | 370/395.42 |
| 7,680,139 B1* | 3/2010 | Jones et al. | 370/414 |
| 7,710,871 B2* | 5/2010 | Lavian et al. | 370/230 |
| 2002/0021701 A1* | 2/2002 | Lavian et al. | 370/401 |
| 2002/0054574 A1* | 5/2002 | Beach et al. | 370/279 |
| 2002/0141379 A1* | 10/2002 | Davari et al. | 370/351 |
| 2003/0099250 A1 | 5/2003 | Blanc et al. | |
| 2003/0103500 A1* | 6/2003 | Menon et al. | 370/389 |
| 2004/0095885 A1* | 5/2004 | Yang | 370/235.1 |
| 2004/0163084 A1* | 8/2004 | Devadas et al. | 718/103 |
| 2004/0179535 A1* | 9/2004 | Bertagna | 370/395.21 |
| 2004/0213156 A1* | 10/2004 | Smallwood et al. | 370/232 |
| 2005/0270977 A1* | 12/2005 | King et al. | 370/235 |
| 2005/0281235 A1* | 12/2005 | Beach et al. | 370/338 |
| 2005/0281252 A1* | 12/2005 | Beach et al. | 370/352 |
| 2006/0002378 A1* | 1/2006 | Beach et al. | 370/352 |
| 2006/0250962 A1* | 11/2006 | Chikamatsu | 370/235 |
| 2007/0047563 A1* | 3/2007 | Shvodian | 370/412 |
| 2007/0297435 A1* | 12/2007 | Bucknell et al. | 370/412 |
| 2010/0014423 A1* | 1/2010 | Furuskar et al. | 370/235 |

* cited by examiner

PRIORITISING DATA TRANSMISSION

TECHNICAL FIELD

This application relates to a method of and apparatus for transmitting data stored in the plurality of queues, each queue having a respective transmission priority.

BACKGROUND TO THE INVENTION

Various known arrangements for transmitting uplink data packets from a mobile terminal to a network core will now briefly be discussed.

PDP contexts (QoS Flows) for both 2G and 3G are categorised into two groups, those which are guaranteed and those which are best-effort. The guaranteed PDP contexts have an associated guaranteed bit rate (or data rate) quantity which the network needs to provide for the PDP Context, and all PDP contexts may have a maximum bit rate. Best Effort PDP contexts do not have an associated guaranteed bit rate quantity. Normally when the guaranteed bit rate associated with a guaranteed PDP Context is not being met, the network will release the context.

In GPRS (2.5G) networks, the network schedules transmission of uplink data packets by a mobile terminal on a quality of service (QoS) flow by service flow basis. That is, the mobile terminal is allocated resources by the network to send uplink data packets for a specific service flow. In this case the additional downlink signalling load introduced by the scheduling of uplink data transmission from the mobile terminal for a specific service flow does not change the balance between signalling load and bandwidth of the system, as it is retrofitted to the design of GPRS and therefore the balance could not be changed. Its late introduction therefore had to rely upon using multiple scheduling identifiers, which theoretically limited the number of users with whom the resource can be shared, however it was felt not a significant problem in GPRS due to the limited bandwidth of the data channel associated with each scheduling channel and therefore normally the resource would have anyway been allocated to a single user to provide sufficient network quality.

When designing a scheduling channel for scheduling the transmission of uplink data packets from a mobile terminal to a network, it is important to be resource efficient, so that the maximum available bandwidth can be used for transmitting data.

In the enhanced data channel (E-DCH) of UTRAN (3G), the network schedules uplink packets sent by the mobile terminal with a single scheduling grant for the mobile terminal. This is possible either by using a primary or a secondary enhanced radio network temporary identifier (E-RNTI), which are used to signal to a single mobile terminal (primary E-RNTI) or a group of mobile terminals (secondary E-RNTI) the granted resources or a combination of both of them. The mobile terminal has a list of QoS flows (logical channels or queues) configured by the network and their associated priority. The mobile terminal shall consider the scheduling grant received by the network to be shared among all the configured QoS flows. With E-DCH a single granted rate is shared across the different queues. The mobile terminal fills the uplink transport block by emptying the queue of each QoS flow according to their priority. A problem with known arrangements of handling guaranteed and peak bit rates for QoS flows arises when the network is congested or when the radio conditions do not allow the exploiting of the maximum configured bit rate. In the congested network or when the radio conditions are not good enough, the resources allocated to a mobile terminal may be restricted. This restriction is applied either by the network by means of a lower scheduling grant assigned or by the same mobile terminal when, due to poor radio condition, mobile terminal transmitter power limitations apply and then the overall transmitter rate shall be scaled down accordingly. If the mobile terminal is configured with multiple QoS flows, and the highest priority flow has a guaranteed bit rate, and a peak bit rate higher than the guaranteed bit rate, this can cause resource starvation for the guaranteed bit rates for lower priority QoS flows. That is, the resources available to transmit uplink data for a particular mobile terminal may be such that, after transmission of the highest priority QoS flow, there is insufficient bandwidth available to transmit lower priority but "guaranteed" QoS flows for that mobile terminal.

This issue also occurs when operating two best-effort QoS flows in parallel: the resource used by the higher priority flow can grow to fill the whole grant allocated to the mobile terminal.

In the know arrangements discussed above all the data in a higher priority queue, up to the maximum or peak bit rate, are transmitted before data from a lower priority queue are transmitted. In the known arrangements the guaranteed bit rate is used by the network to allocate resources and may also be used to trigger release of a queue PDP context when the guaranteed bit rate is not being met.

Accordingly, it would be desirable to provide improved handling of queues of data for a mobile terminal with a telecommunications network.

SUMMARY OF THE INVENTION

According to system described herein, a method of transmitting from a first device to a second device data stored in a plurality of queues, each queue having a respective transmission priority, includes setting the data in each of said queues to be either primary data or secondary data, or a combination of primary data and secondary data; and transmitting the data from the queues in an order in dependence upon the priority of the queue and whether the data in that queue is primary data or secondary data.

In embodiments primary data are transmitted at a guaranteed or minimum bit rate.

According further to the system described herein, a method of transmitting from a first device to a second device data stored in a plurality of queues, each queue having a respective transmission priority, includes setting the data in each of said queues to be either primary data or secondary data or a combination of primary data and secondary data; during a first data transmission phase transmitting the primary data from each queue in order according to the transmission priority of the queue; and during a second data transmission phase transmitting the secondary data from each queue in order according to the transmission priority of the queue.

According further to the system described herein, a method of transmitting from a first device to a second device data stored in a plurality of queues, each queue having a primary data transmission priority and a secondary data transmission priority, includes setting the data in each of said queues to be either primary data or secondary data or a combination of primary data and secondary data; during a first data transmission phase transmitting the primary data from each queue in order according to the primary data transmission priority of the queue; and during a second data transmission phase transmitting the secondary data from each queue in order according to the secondary data transmission priority of the queue.

According further to the system described herein, a method of transmitting from a first device to a second device data stored in a plurality of queues, each queue having a respective transmission priority, includes allocating a plurality of said queues with minimum data transmission rate; and transmitting data from said plurality of queues at (only) said minimum data transmission rate in an order in dependence upon the priority of the queue, and subsequently transmitting further data from said queues in an order in dependence upon the priority of the each queue.

The system described herein also provides apparatus for performing these methods.

The embodiments provide:

Each QoS Flow can be split into two parts, the first part up to a lower bit rate (A), and the second part between the lower bit rate (A) and a higher bit rate (B).

The best effort QoS flows also are provided with a best effort bit rate (C), which is prioritised and given its own priority when determining the scheduling, however this bit rate is not guaranteed by the network scheduling algorithm.

The lower bit rate (A) can be generally termed the prioritised bit rate, however it is called the guaranteed bit rate for Guaranteed bearers, and for best effort bearers is has been termed the best-effort bit rate in this paper.

The higher bit rate (B) for guaranteed bearers and best effort bearers is termed the maximum bit rate (MBR), however the higher bit rates (B) for best effort bearers may be grouped under a single term Aggregated Maximum Bit Rate, with a single value which is shared by all best effort bearers.

BRIEF DESCRIPTION OF THE DRAWINGS

Embodiments of the system described herein will now be described by way of example, with reference to the accompanying drawings, in which.

In the drawings like elements are generally designated with the same reference sign.

DETAILED DESCRIPTION OF VARIOUS EMBODIMENTS

Figure 1:
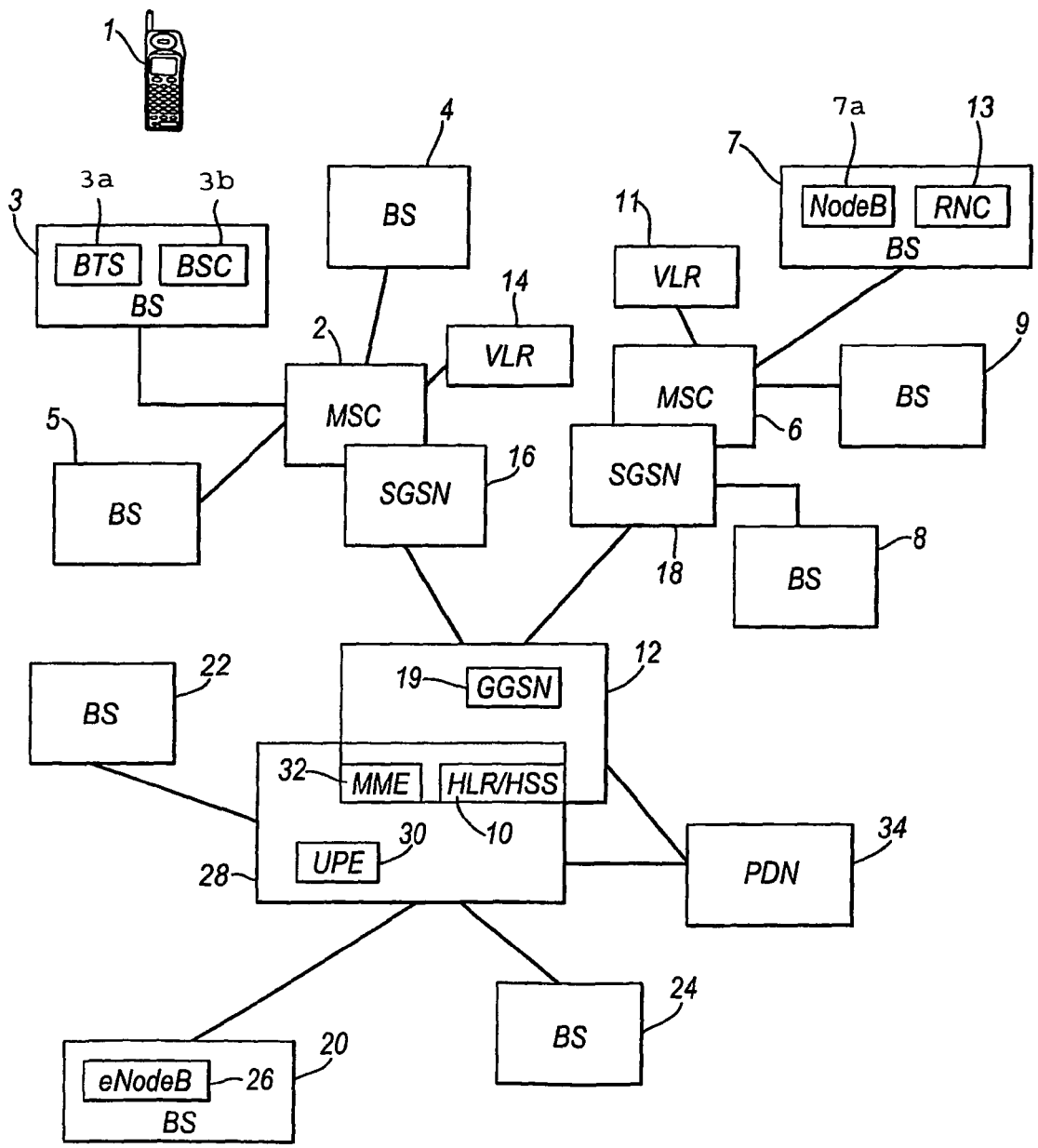
FIG. 1 is a diagrammatic drawing of key elements of a mobile telecommunications network for use in explaining the operation of such a network.

Key elements of a 2G/2.5G and 3G mobile telecommunications network, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 3a and a base station controller (BSC) 3b. A BSC may control more than one BTS. The BTSs and BSCs comprise the radio access network.

In a UMTS (3G) mobile telecommunications network, a radio network controller (RNC) 13 may control more than one node B 7a. The node B's and RNC's comprise the radio access network.

Conventionally, the base stations are arranged in groups and each group of base stations is controlled by one mobile switching centre (MSC), such as MSC 2 for base stations 3,4 and 5. As shown in FIG. 1, the network has another MSC 6, which is controlling a further three base stations 7,8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. GGSN 19 provides IP connectivity for the CN 12.

A development of 3G mobile telecommunications is "evolved" UTRA or E-UTRA, also referred to as SAE (System Architecture Evolution)/LTE (Long Term Evolution).

Elements of an LTE network are also shown in FIG. 1. The base stations 20,22 and 24 comprise an eNodeB (evolved Node B) 26. The RRC signalling with the mobile terminal 1 terminates at the eNode B 26, the eNode B comprising the RAN of the LTE network. The eNode B 26 performs the functions of both the Node B and a large part of the RNC of the 3G/UMTS network. The network core 28 of the LTE network includes User Plane Entity (UPE) 30, the HLR/HSS 10 (a common HLR/HSS shared with the network core 12 of the GSM/UMTS network) and also Mobility Management Entity (MME) 32 (also shared with the network core 12 of the GSM/UMTS network). A plurality of UPEs are usually provided, although only one is shown.

Although shown separately in FIG. 1, the UPE 30 and GGSN 19 may be combined to form a single element. For the purposes of this document, UPE 30 and GGSN 19 are considered to be a common element with one interface to Packet Data Network (PDN) 34 (for example, the Internet).

Both the GSM/UMTS and LTE networks communicate with PDN 34.

What has been described thus far with reference to FIG. 1 is known.

The data to be transmitted by mobile terminal 1 in the uplink in the packet switched domain may be for a variety of purposes, with varying priorities (QoS requirements). For example, the data may include data for allowing the user to play an interactive game with another subscriber to the network. The gaming data transmitted might be data indicating that movement has occurred in the game of one or other of the players. This movement needs to be graphically represented on the Opponent's mobile terminal rapidly. Typically, maximum delay of 50 ms is acceptable for the transmitting of this data between the mobile terminals. Lower priority data might include voice data to allow conversational speech between two users. Lower priority data again might include gaming control data—for example, a message indicating that the game is still active on a user's mobile terminal. Still lower priority data might include voice control data. It should be understood that these data types are given only by way of example, and that the system described herein is applicable to scheduling many other data types.

Data of each of the types are stored in a separate queue (QoS flow or logical channel). Each queue may be allocated a "guaranteed" bit rate (GBR) and a "non-guaranteed" bit rate (non-GBR). The guaranteed bit rate is the rate of data that should be delivered in the next scheduling period in order to fulfil the guaranteed bit rate of the QoS requirements. The guaranteed bit rate can be considered to be the minimum bit rate required to meet the QoS requirement for a particular queue. The guaranteed bit rate can also be considered to be the bit rate required to transmit primary data from the queue (whereas, date transmitted at the non-GBR can be considered to be secondary data). The GBR is not in fact guaranteed. Data are only transmitted at the GBR is sufficient resource is available. The non-GBR (or maximum bit rate) is the maximum bit rate at which data are transmitted from the queue in the scheduling period.

This embodiment is based on guaranteed QoS Flows and non-guaranteed QoS Flows. However, the system described herein is also applicable for best-effort QoS Flows or a mix of guaranteed and best-effort QoS Flows. For the Best-Effort QoS Flows, instead of having guaranteed and non-guaranteed bit rates, would have prioritised and non-prioritised bit rates.

Figure 2:
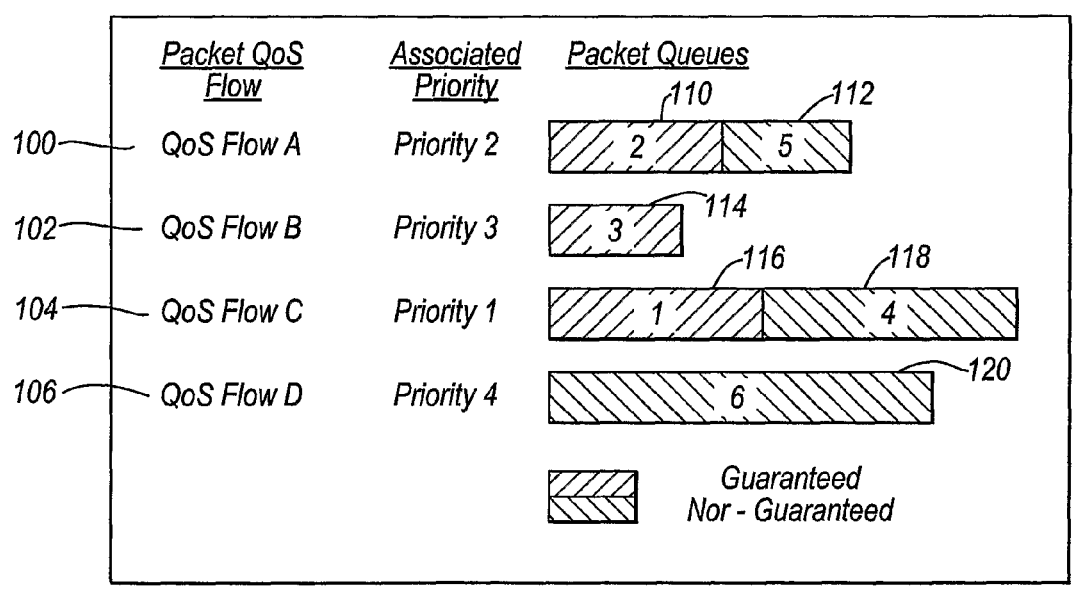
FIG. 2 shows four queues together with their associated priority and the guaranteed and non-guaranteed data transmission rates for each of those queues.

FIG. 2 shows first queue (QoS flow A) 100, second queue (QoS flow B) 102, third queue (QoS flow C) 104 and fourth queue (QoS flow D) 106. Each queue is given a particular priority. The third queue 104 is given priority 1. The first queue 100 is given priority 2. The second queue 102 is given priority 3. The fourth queue 106 is given priority 4.

The first queue 100 has a guaranteed bit rate 110 and a non-guaranteed bit rate 112. The second queue 102 has a guaranteed bit rate 114 and no non-guaranteed bit rate. The third queue 104 has a guaranteed bit rate 116 and a non-guaranteed bit rate 118. The fourth queue 106 has no guaranteed bit rate but has a non-guaranteed bit rate 120. The length of the boxes shown in FIG. 2 corresponds to the bit rate—i.e. the amount of data allocated to be transmitted in a particular scheduling period.

The fourth queue 106 is provided with only a non-guaranteed bit rate 120 because, for example, this queue transmits data relating to a background service, and this data do not need to be transmitted in a time-critical manner.

When the mobile terminal 1 receives from the network core 12 the grant of permission to send data in the uplink, the terminal 1 transmits data from each of the queues in order of priority and sends packets within the guaranteed bit rate for that queue on receipt of the grant. If there is still capacity in the grant after transmission of the guaranteed data of the first priority queue 104, the mobile terminal then transmits the data from the second priority queue 100 up to the guaranteed bit rate. This process is repeated until either the grant capacity is exhausted or all the queues have been served to their guaranteed bit rates.

The prior art, described above, in contrast, transmits data from each queue up to the maximum bit rate before moving on to the next priority queue and transmitting data therefrom. In the prior art transmission of data from a queue does not stop when the guaranteed bit rate is satisfied. Thus, in the prior art, it is less likely that data will be transmitted at the guaranteed bit rate from lower priority queues.

Returning to the discussion of the embodiment, when all the queues have been served to their guaranteed bit rates, the mobile terminal repeats the process in queue priority order and transmits data at the non-guaranteed bit rates (maximum bit rates) until the grant capacity is exhausted or all the queues are empty (all the data in the queues have been transmitted). The numbers in the boxes 110,112,114,116,118 and 120 indicate the order in which the data in those boxes are transmitted.

Figure 3:
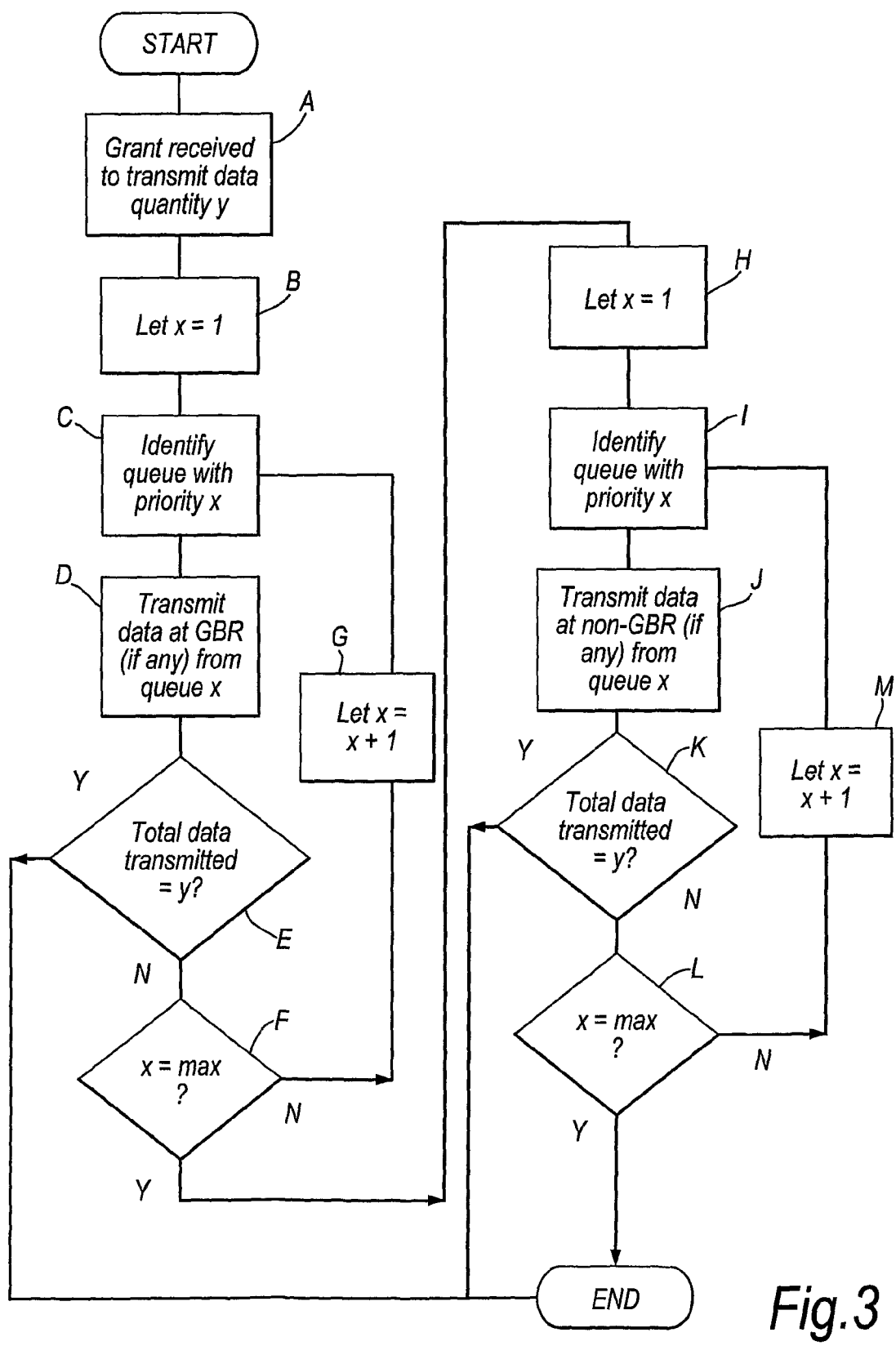
FIG. 3 is a flow chart used to explain how the data in the queues of FIG. 2 are transmitted from a mobile terminal, in accordance with a first embodiment of the system described herein.

The process for transmitting the data in the queues will be more clearly understood by the following description with reference to the flow chart of FIG. 3. At step A the mobile terminal is granted permission by the network to transmit a quantity y of data during a particular scheduling period. At step B the initial priority of the queue to be handled is set, by letting variable x=1—that is, the queue to be handled is the first priority queue 104.

At step C the queue with priority x (i.e. the queue 104 with the first priority) is identified.

At step D the mobile terminal 1 transmits a quantity of data from the queue 104 so that the GBR 116 is satisfied.

At step E it is determined whether the total data transmitted has reached the quantity y set by the grant permission received from the network. If the grant quantity is reached, then the process ends. Otherwise, it is determined at step F whether the process has cycled through to the lowest priority queue (queue 106 with priority 4). This is done by determining whether the current queue priority, x, equals the maximum queue priority (4 in this example).

In practice, the determination at step E may be performed after each byte (or any other portion) of the data in step D is transmitted, rather than the determination at step E being performed only after all the data in step D are transmitted.

If the maximum queue priority has not been reached, then at step G the current queue priority is incremented by incrementing the value x by 1, so that x=2. Step C is then performed again, and the queue with priority 2 (x=2) is identified, i.e. queue 100.

At step D a quantity of data from queue 100 are transmitted so that the GBR 110 is satisfied.

At step E it is determined whether the total data transmitted (that is, the total data transmitted since the grant was received in step A, being at this stage the GBR data 116 of the first priority queue 104 and the GBR data 110 of the is second priority queue 100), has reached the amount y of the data permitted to be transmitted by the mobile terminal 1 by the grant receive message y.

If it is determined at step E that the total data transmitted equals the maximum permitted by the grant message, the process ends. Otherwise, it is determined whether the priority of the queue being considered equals the maximum (lowest) value. If the lowest priority value is not currently being considered, then, at step G, the priority of the queue is incremented, so that x=3.

Steps C, D, E, F and G are repeated in a similar manner to transmit a quantity of data of the queue 102 with priority 3 to satisfy GBR 114.

After the priority of the queue being considered is incremented again in step G, so that x now equals 4, at step C the queue 106 with priority 4 is identified. At step D it is determined that queue 106 does not have a GBR, and therefore no data are transmitted in step D. Step E is performed in the usual way. If it is determined that the total data transmitted thus far (i.e. GBR data 116,110 and 114 in total) has not reached the value y of data permitted by the grant permission received at step A, step F is then performed which determines whether the maximum (lowest) priority queue has been considered. As queue 106 is the lowest priority queue in this embodiment, the value "max" will be set to 4, so that at step F it is determined that the lowest priority queue has been considered.

At step H the value x is then reset to 1. At step I the queue with priority x (i.e. queue 104 with priority 1, is identified).

At step J a quantity of data of the queue 104 are transmitted so that the GBR 118 is satisfied. At step K it is determined whether the total data transmitted by the process of FIG. 3 has reached the maximum permitted in the grant permission message received at step A (i.e. whether the total data 116,110, 114 and 118 equals the value y). If the value y is reached, then the process ends. As with step E, step K could in fact be performed after each byte (or other quantity of data) is transmitted at step J, rather than after the whole of the secondary data are transmitted at step J.

At step L it is determined whether the queue being considered is the lowest priority queue by comparing the value x to the value "max", which again has a value "4", corresponding to the lowest priority queue (priority 4) of queue 106. As x currently has a value 1, step M is then performed which increments the value of x so that the next priority queue, queue 100 (priority 2) is considered.

At step I the queue 100 is identified. At step J a quantity of data from the queue 100 are transmitted so that the non-GBR 112 is satisfied. At step K it is again determined whether or not the value y is exceeded. If the value y is not exceeded, then, step L is performed and the current value of x (2) is compared to the maximum queue priority (4). Step M is then performed and the value of x is incremented so that the queue priority considered is the queue 102 with priority 3. At step I the queue 102 is identified. At step J no data are transmitted because queue 102 includes no non-GBR. Steps K and L are then performed and, assuming that the values of y and "max" are not reached, step M is then performed which again increments the priority of the queue being considered, so that queue 106 of priority 4 is considered. At step I, queue 106 is identified. At step J a quantity of data of queue 106 are transmitted so that the non-GBR 120 is satisfied. Step K is then performed, and assuming that the value y has not been reached, at step L the current value of x (4) is compared to the value "max", which is set to 4. Consequently, the process of FIG. 3 then to ends.

Figure 4:
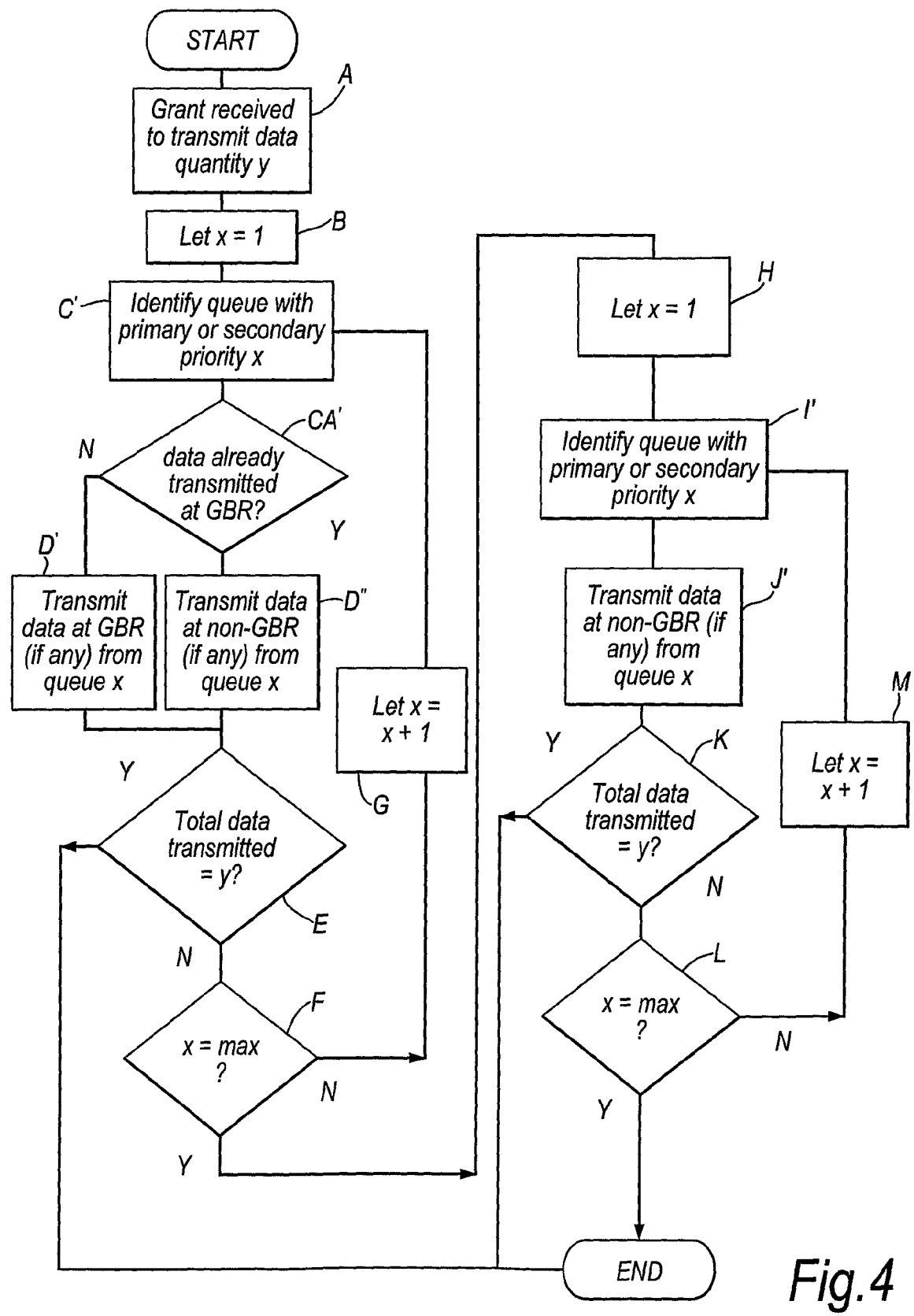
FIG. 4 is a flow chart of a second embodiment of the system described herein, which is a modification of the FIG. 3 embodiment.

FIG. 4 shows a second embodiment of the system described herein, similar to the first embodiment of FIG. 3. The second embodiment allows the mobile terminal 1 to set a secondary priority for one or more of the queues, this being the priority with which data of that queue are transmitted at the non-GBR. Compared to the first embodiment, this allows the mobile terminal to schedule data of a queue to be transmitted at a non-GBR with a higher priority than the transmission of data of another queue at its GBR.

Figure 5:
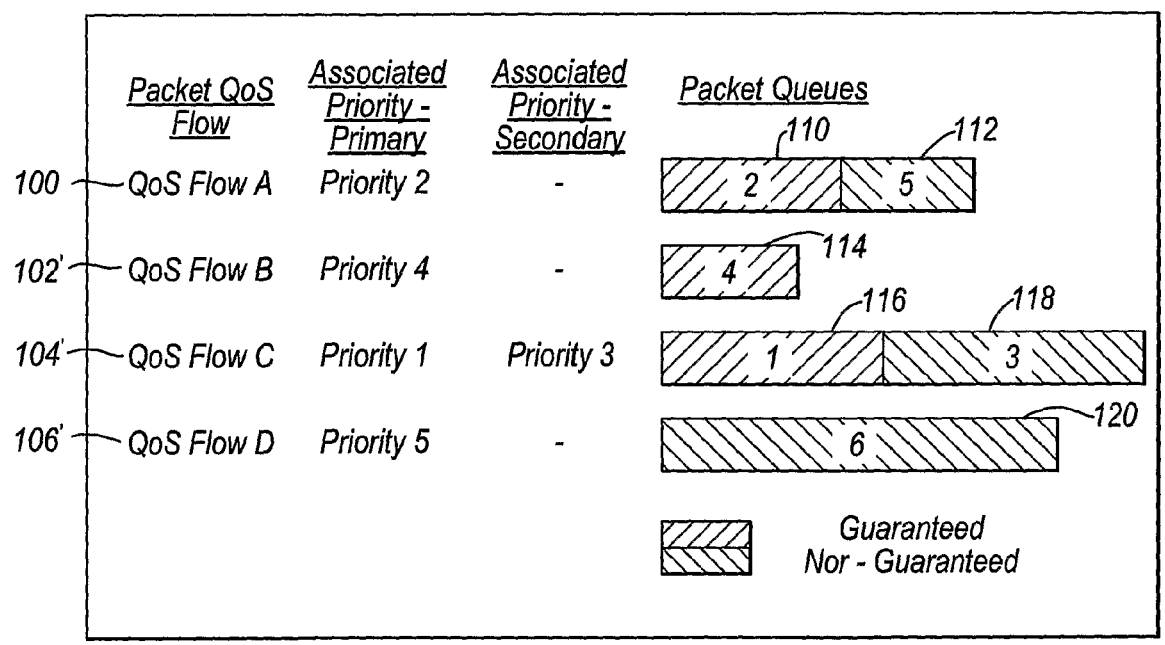
FIG. 5 shows four queues of data and their associated primary and secondary priorities, together with the guaranteed and non-guaranteed bit rates for transmission in each of those queues.

FIG. 5 shows the arrangement of the queues, which is similar to the arrangement of the queues of FIG. 2. However, queue 104' with a primary priority 1 is additionally provided with a secondary priority, priority 3. The priority of the queue 102' has the lower priority, priority 4, and the priority of the queue 106' has a still lower priority, priority 5. The order in which the primary and secondary data of queue 104', 102', 106' and 100 are transmitted is indicated by the numbers in the boxes 110,112,114,116,118 and 120 representing the packet queues of FIG. 5.

The steps performed in the flow chart of FIG. 4 correspond mainly to the steps performed by the flow chart of FIG. 3.

Initially, step A and step B are performed as in FIG. 3. At modified step C' the queue with a primary or secondary priority x is identified, i.e. initially the queue with primary or secondary priority 1, queue 104'. At step CA' it is determined whether the data has already been transmitted from the queue 104' at the GBR 116. If the data have not been transmitted at the GBR 116 (which it has not in this example 104), then step D' is performed and a quantity of data from queue are transmitted so as to satisfy the GBR 116. The decision steps E and F are then performed in the same manner as the first embodiment. At step G, as in the first embodiment, the value of x is incremented.

At step C' the queue with primary or secondary priority 2 is identified, this being queue 100 with priority 2. At decision step CA' it is determined that data of queue 100 have not already been transmitted at the GBR 110, so that step D' is then performed to transmit a quantity of data from queue 100 at the GBR 110. Steps E, F and G are then performed, and the value of x is incremented so that, at step C' the queue 104' (again) but with the secondary priority 3 is identified. At decision CA' it is determined that the data of queue 104' have been transmitted at the GBR 116, so that step D" is performed and quantity of data of the queue 104' are transmitted at the non-GBR 118.

Steps E, F and G are then performed so that the value of x is again incremented, so that x=4 and the queue 102' with priority 4 is identified in step C'. Following decision step CA', step D' is performed to transmit a quantity of data of queue 102' at GBR 114.

Steps E, F and G are then performed so that the value of x is incremented again to a value of 5. At step C' the queue 106', with priority 5, is identified. At step CA' it is determined whether the data of the queue 106 have been transmitted at its GBR. As queue 106 has no GBR, it is determined that the primary data have not already been transmitted at the GBR, and consequently step D' is performed. At step D' no data are transmitted because queue 106 has no GBR.

Steps E and F are performed in the usual way. At step F the queue priority currently being considered, priority 5, equals the maximum value "max", and consequently step H is performed and the value of x is reset to 1. At step I' the queue with primary or secondary priority 1 is identified, i.e. queue 104'. At step J', normally data of the relevant queue would be transmitted at the queue's non-GBR. However, because for queue 104', the secondary data 118 were transmitted in step D", no data are transmitted in step J'. At step K it is determined whether the total data transmitted in the process of FIG. 4 has reached the value of data permitted to be transmitted in the grant permission received at step A. If the value y has not been reached, then at step L it is determined whether the lowest priority queue (in this embodiment queue 106' with priority 5) is being considered. As the queue being considered is queue 104' with priority 1, step M is performed to increment the priority of the queue being considered. At step I' the queue 100 with priority 2 is identified. At step J' a quantity of data of the queue 100 are transmitted at the GBR 112. Steps K and L are then performed again, and the queue priority is incremented in step M.

At step I' queue 104' is identified again as it has the secondary priority 3. At step J' no data are transmitted because data were transmitted at step D" at the non-GBR 118. Steps K and L are performed again, and the value of the queue priority is incremented at step M.

At step I' the queue with priority 4, queue 102' is identified. At step J' no data are transmitted because queue 102' includes no non-GBR. Steps K and L are performed. At step M the value of the queue priority being considered is incremented again.

At step I' the queue with priority 5 is identified, queue 106. At step J' a quantity of data of queue 106 are transmitted to satisfy the non-GBR 120. Step K is then performed. At step L it is determined that the priority of the queue 106 being considered, priority 5, equals the lowest priority value, "max", of 5. The process of FIG. 4 then ends.

Figure 6:
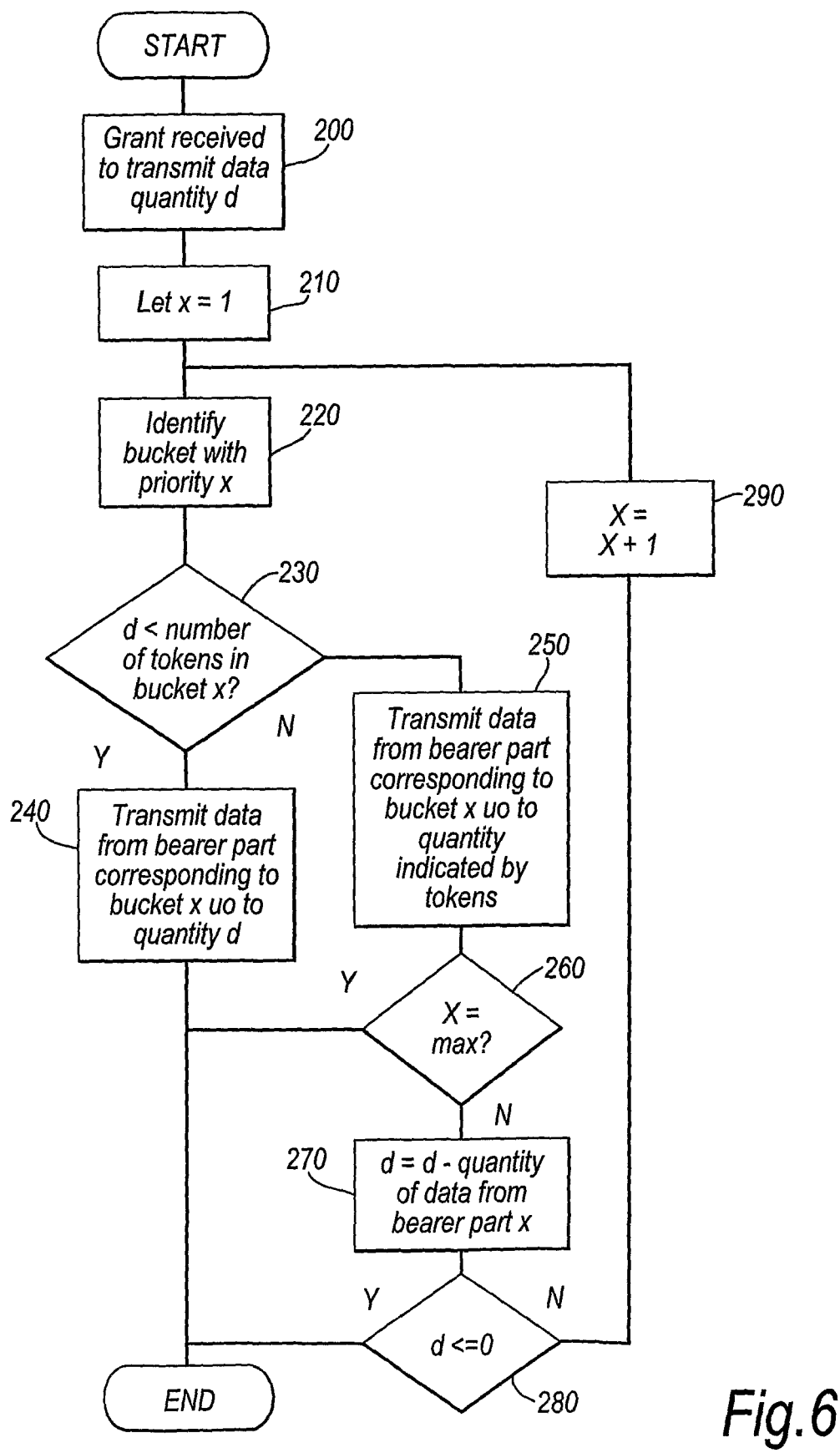
FIG. 6 is a flow chart according to a third embodiment of the system described herein which explains the process for transmitting data from the queues in accordance with the tokens stored in the buckets.

A third embodiment of the system described herein will now be described with reference to the flow chart of FIG. 6. These embodiments relate to a SAE/LTE mobile telecommunications network. In this embodiment the data to be transmitted by the mobile terminal 1 are prioritised. In this embodiment the radio bearer for each queue is split between primary data with a guaranteed bit rate and secondary data with a non-guaranteed bit rate. Each part of each radio bearer is assigned a relative priority. The mobile terminal 1 reports the queue status of each radio bearer or group of radio bearers to its serving eNodeB 26. When granted permission to transmit uplink data to the eNodeB, the mobile terminal 1 transmits the data in order of priority.

The minimum bit rate is signalled to the mobile terminal (e.g. in layer 3 signalling) by the eNodeB at the establishment of a Radio Bearer. When sending data for the radio bearers, periodically the mobile terminal reports the status of the queue of each QoS Flow or group of QoS Flows to the eNodeB periodically. The eNodeB calculates what resource it is providing to the mobile terminal to ensure that it meets the GBR (for GBR Radio Bearers) and attempt to meet the minimum bit rate (for the Best Effort Radio Bearers). The eNodeB grants resource to the mobile terminal using a single ID. The mobile terminal then uses the minimum and guaranteed bit rates to select which data are being sent to the network in the granted resources.

The minimum bit rate is the same as the guaranteed bit rate for non-guaranteed radio bearers.

The data to be transmitted by the mobile terminal 1 in the uplink can therefore be considered to comprise a plurality of radio bearer parts, each with a different priority. A "token bucket" model is used to control transmission of the uplink data in accordance with this embodiment of the system described herein. A respective bucket is provided for each priority of data to be transmitted. Periodically a token (representing the right to transmit a quantity of data) is added to each bucket. When the mobile terminal is granted resource, it is allowed to transmit up to the amount represented by the number of tokens in each bucket. When transmitting data the mobile terminal removes from the bucket the number of tokens equivalent to the quantity of data sent. When a bucket is full, further tokens are discarded.

For each queue a first bucket provided for the guaranteed bit rate data and a second bucket provided for the non-guaranteed bit rate data. As each bucket essentially represents the guaranteed or the non-guaranteed segment of each radio bearer, it therefore it logically has an associated priority (from the radio bearer segment). From the point of view of the mobile terminal a difference between the guaranteed bit rate data and the non-guaranteed bit rate data is that their buckets are emptied with different priorities. From a network point it is only the buckets which are associated with a guaranteed RB that will reliably be emptied.

It should be noted that a separate Maximum bit rate is not required for all SAE Bearers, and that an Aggregated Maximum bit rate (AMBR) can be used then there is not the need to run additional multiple Buckets to handle this in the mobile terminal. In fact it may not be needed to be signalled to the mobile terminal at all, as long as the buffer status reporting is provided with enough accuracy then the eNB can limit the amount of grants provided to the mobile terminal. As the TOTAL bit rate for the mobile terminal is controlled by how much resource the mobile terminal is granted by the eNodeB, then this AMBR is assumed to be handled by the mobile terminal after meeting the MBR of the GBR bearers. This means that the TOTAL grant=MBR1+MBR2+AMBR. As the mobile terminal knows the MBR1 and MBR2, when a grant is received the mobile terminal serves MBR1 and MBR2 first therefore the amount of resources for AMBR is directly controlled by TOTAL grant.

By setting the size of the buckets (the maximum number of tokens each can hold), the maximum amount of data that can be transmitted during one resource grant by each bearer can be controlled.

Every 1/x seconds, possibly with 1/x second equalling the transmission time interval (TTI) length, a token is added to each bucket. There is a bucket per radio bearer part, i.e. two per radio bearer. If the bucket is full then the token is discarded.

The procedure for filling the buckets can also be expressed by the following algorithm:
For b=1 to Number_of_Buckets
 If BucketStatus_b<BucketSize_b then BucketStatus_b+ Token Next b Number_of_Buckets is the number of buckets of different priority.

BucketSize is the maximum number of tokens that a bucket is able to receive.

BucketStatus is the number of tokens in a bucket.

The procedure for adding tokens to each of the buckets may be repeated every TTI, or could be lengthened such that the process of adding tokens is only completed every second (or at any other interval). If the one second time interval is selected, then, for example, instead of a token being added to a bucket every 1 ms, 1000 tokens could be added every second. The correct repetition interval or and token size is dependent on the desired maximum latency and the maximum amount of concatenation required.

If it is not acceptable to use the above method of adding tokens to buckets, then an alternative solution would be to avoid the mobile terminal 1 performing any process when it has not been given a radio resource grant. The mobile terminal 1 calculates how long it has been since it last received a radio resource grant based on storing a time in which the last radio resource grant was given to the mobile terminal 1 and then filling the token buckets based on the number of filling instances which should have occurred in that time. Each time the mobile terminal 1 receives a Radio Resource Grant it stores a TTI Time Reference, and calculates the time since the previous stored TTI Time Reference. The mobile terminal 1 then scales the Token size by (New TTI_Time_Reference-Old TTI_Time_Reference)/TTI and adds this to each of the token buckets which should have been completed in the dormant time (time where not Radio Resource Grant had not been received). In this way, the process of filling the buckets can be avoided from being initiated every TTI, especially where no other tasks are required to be performed.

The procedure when the eNodeB 26 grants the mobile terminal 1 permission to transmit data in the uplink will now be described with reference to FIG. 7. When the mobile terminal 1 receives resource grant permission, the mobile terminal 1 quantifies how much resource this equates to in terms of bits for transmission in the uplink. The mobile terminal 1 then transmits data from the respective parts of the bearers in descending order of priority until the resource grant has been fully assigned. The mobile terminal calculates the max_allowed_transmission value for each radio bearer part from the number of tokens which are currently in the bucket associated with the radio bearer part and the packets in the buffer associated with the radio bearer part (min of bucket_status and queue status) The queue_status is the number of packet/bits available to send associated with a specific packet queue. The bucket_status is the number of tokens in a bucket.

Resources are assigned to each radio bearer part up to the value max_allowed_transmission.

This process is described in more detail with reference to the flow chart of FIG. 6. At step 200 the mobile terminal 1 is granted permission to transmit data quantity d (converted from a quantity of bits to quantity of tokens) in the uplink. The value "x" is set to 1 at step 210. In this flow chart the value "x" indicates the priority of the bucket to be considered. At step 220 the bucket with priority "x", i.e. the highest priority 1, is identified. At step 230 it is determined whether the total data quantity d for which permission to transmit has been granted is less than the number of tokens in the bucket with priority x. If the value of d is less than the number of tokens in the bucket with priority x, then, at step 240, data are transmitted from the bearer part corresponding to bucket x up to the data quantity d. The process of FIG. 6 then ends.

However, if it is determined at step 230 that the value of d is not less than the number of tokens in bucket x, then, at step 250, data are transmitted from the bearer parts corresponding to the bucket x up to the quantity indicated by the tokens. At step 260 it is determined whether x=the value "max", which value corresponds to the lowest priority radio bearer. That is, it is determined whether the radio bearer currently being considered is the lowest priority radio bearer. If at step 260 it is determined that x=the value "max", then the process of FIG. 6 ends. Otherwise, at step 270, the quantity d of data for which transmission has been granted is reduced by the quantity of data transmitted from the bearer part x.

At step 280 it is determined whether the value of d calculated at step 270 is less than or equal to 0. If the value of d is less than or equal to 0, then the process of FIG. 6 ends. Otherwise, the value of x is incremented at step 290, and the bucket with a priority corresponding to the incremented value of x is identified in step 220. In this iteration of the loop shown in FIG. 6, the value of x will be 2. Steps 230, 240/230,250, 260,270,280 and 290 are then repeated until the value of d is less than or equal to 0 or the bucket of lowest priority has been considered.

The procedure on receipt of the resource grant message can also be expressed by the following algorithm:

```
For x = 1 to Number_of_Queues (bearer parts)
    Max_Allowed_Transmission = Min          Update Bucket Status
    (BucketStatus_x, QueueStatus_x)
    If Grant < Max_Allowed_Transmission then
        BucketStatus_x = BucketStatus_x -    Update Bucket Status
        Max_Allowed_Transmission
        QueueGrant_x = Grant                 Update Queue Grant
        END
    If Grant > Max_Allowed_Transmission then
        BucketStatus_x = BucketStatus_x -    Update Bucket Status
        Max_Allowed_Transmission
        QueueGrant_x =                       Update Queue Grant
        Max_Allowed_Transmission
        Grant = Grant -                      Update the Grant
        Max_Allowed_Transmission
Next x
```

QueueGrant_x is the variable indicating the decided/calculated grant for packet queue associated with radio bearer X.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of transmitting from a first device to a second device data sets stored in a plurality of queues, each of the data sets having a respective data transmission priority and each of the plurality of queues having a respective queue priority, the method comprising:

defining data in each of said plurality of queues to be at least one of: primary data and secondary data, wherein each of the plurality of queues includes data defined as the primary data and/or data defined as the secondary data, wherein the primary data from all of the plurality of queues form a primary data set of the data sets, and wherein the secondary data from all of the plurality of queues form a secondary data set of the data sets; and transmitting the data from the plurality of queues in an order in dependence upon the respective data transmission priority of the data set in which the data is defined and according to the respective queue priority for each queue of the plurality of queues, wherein the transmitting step further includes:

transmitting the primary data set including transmitting the primary data from each queue of the plurality of queues in an order in accordance with the respective queue priority of each of the plurality of queues, wherein the primary data is transmitted from each queue of the plurality of queues at a first transmission rate; and after transmitting the primary data set, transmitting the second data set including transmitting the secondary data from each queue of the plurality of queues in an order in accordance with the respective queue priority of each of the plurality of queues, wherein the secondary data is transmitted from each queue of the plurality of queues at a second transmission rate.

2. The method of claim 1, wherein the respective queue priority for each of the plurality of queues, selected from a range of priorities, are different.

3. The method of claim 2, further comprising:

providing at least one of the plurality of queues with a primary priority within said range of priorities and with a secondary priority within said range of priorities; and transmitting the primary data from said at least one queue in an order in accordance with the primary priority of the at least one queue and transmitting the secondary data from said at least one queue in an order in accordance with the secondary priority of the at least one queue.

4. The method of claim 1, further comprising:

allocating resources for data transmission such that the primary data of each of said plurality of queues is transmitted at a minimum predetermined rate.

5. The method of claim 4, further comprising:

allocating resources for data transmission such that the secondary data of each of said plurality of queues is transmitted at a maximum predetermined rate, greater than said minimum predetermined rate.

6. The method of claim 1, further comprising:

providing a respective bucket for the primary and secondary data of each queue of the plurality of queues;

providing tokens to the respective buckets, each token enabling a predetermined quantity of data to be transmitted from its bucket; and distributing data from said buckets in accordance with the tokens therein.

7. The method of claim 1, wherein the primary data and the secondary data of each queue of the plurality of queues are associated with a respective bucket, and wherein permission to transmit data is provided by providing a bucket with a token.

8. The method of claim 1, wherein the first device includes a cellular telecommunications terminal.

9. The method of claim 8, wherein the second device includes a base station.

10. The method of claim 1, wherein the second device grants resources for the transmission of said data, and the first device controls the order in which the data are transmitted.

11. The method as recited in claim 1, wherein the first transmission rate is a guaranteed rate and the second transmission rate is a non-guaranteed rate.

12. A method of transmitting from a first device to a second device data sets stored in a plurality of queues, each of the data sets having a respective data transmission priority and each of the plurality of queues having a respective queue priority, the method comprising:

allocating a plurality of said plurality of queues with a minimum data transmission rate;

defining data in each of said plurality of queues to be at least one of: primary data and secondary data, wherein each of the plurality of queues includes data defined as the primary data and/or data defined as the secondary data, wherein the primary data from all of the plurality of queues form a primary data set of the data sets, and wherein the secondary data from all of the plurality of queues form a secondary data set of the data sets;

transmitting the data from the plurality of queues in an order in dependence upon the respective data transmission priority of the data set in which the data is defined and according to the respective queue priority for each queue of the plurality of queues, wherein the transmitting step further includes:

transmitting the primary data set including transmitting the primary data from said plurality of queues at at least said minimum data transmission rate in an order in accordance with the respective queue priority for each queue of the plurality of queues, wherein the primary data is transmitted from each queue of the plurality of queues at a first transmission rate; and after transmitting the primary data set, transmitting the secondary data set including transmitting the secondary data from said plurality of queues in an order in dependence upon the respective queue priority of each of the plurality of queues, wherein the secondary data is transmitted from each queue of the plurality of queues at a second transmission rate.

13. The method as recited in claim 12, wherein the first transmission rate is a guaranteed rate and the second transmission rate is a non-guaranteed rate.

14. An apparatus for transmitting data sets stored in a plurality of queues, each of the data sets having a respective data transmission priority and each of the plurality queues having a respective queue priority, the apparatus comprising:

a setting device that defines data in each of said plurality of queues to be at least one of: primary data and secondary data, wherein each of the plurality of queues includes data defined as the primary data and/or data defined as the secondary data, wherein the primary data from all of the plurality of queues form a primary data set of the data sets, and wherein the secondary data from all of the plurality of queues form a secondary data set of the data sets; and a transmitting device that transmits the data from the plurality of queues in an order in dependence upon the respective data transmission priority of the data set in which the data is defined and according to the respective queue priority for each queue of the plurality of queues, wherein the transmitting of the data by the transmitting device includes:

transmitting the primary data set including transmitting the primary data from each queue of the plurality of queues in an order in accordance with the respective queue priority of each of the plurality of queues; and after transmitting the primary data set, transmitting the secondary data set including transmitting the secondary data from each queue of the plurality of queues in an order in accordance with the respective queue priority of each of the plurality of queues, wherein the primary data is transmitted from each queue of the plurality of queues at a first transmission rate, and wherein the secondary data is transmitted from each queue of the plurality of queues at a second transmission rate.

15. The apparatus as recited in claim 14, wherein the first transmission rate is a guaranteed rate and the second transmission rate is a non-guaranteed rate.

16. The apparatus as recited in claim 14, wherein the primary data and the secondary data of each queue of the plurality of queues are associated with a respective bucket, and wherein permission to transmit data is provided by providing a bucket with a token.

17. The apparatus as recited in claim 14, wherein the data sets are transmitted from a first device to a second device.

18. The apparatus as recited in claim 17, wherein the first device includes a cellular telecommunications terminal and the second device includes a cellular telecommunications base station.

19. The apparatus as recited in claim 17, wherein the second device grants resources for the transmission of said data, and the first device controls the order in which the data are transmitted.

20. An apparatus for transmitting data sets stored in a plurality of queues, each of the data sets having a respective data transmission priority and each of the plurality of queues having a respective queue priority, the apparatus comprising:

an allocating device that allocates the plurality of queues with a minimum data transmission rate;

a setting device that defines data in each queue of said plurality of queues to be at least one of: primary data and secondary data, wherein each of the plurality of queues includes data defined as the primary data and/or data defined as the secondary data, wherein the primary data from all of the plurality of queues form a primary data set of the data sets, and wherein the secondary data from all of the plurality of queues form a secondary data set of the data sets; and a transmitting device that transmits the data from the plurality of queues in an order in dependence upon the respective data transmission priority of the data set in which the data is defined and according to the respective queue priority for each queue of the plurality of queues, wherein the transmitting of the data by the transmitting device includes:

transmitting the primary data set including transmitting the primary data from said plurality of queues at at least said minimum data transmission rate in an order in dependence upon the respective queue priority of each of the plurality of queues, and after transmitting the primary data set, transmitting the secondary data set including transmitting the secondary data from said plurality of queues in an order in dependence upon the respective queue priority of each of the plurality of queues, wherein the primary data is transmitted from each queue of the plurality of queues at a first transmission rate, and wherein the secondary data is transmitted from each queue of the plurality of queues at a second transmission rate.

21. The apparatus as recited in claim 20, wherein the first transmission rate is a guaranteed rate and the second transmission rate is a non-guaranteed rate.

* * * * *